(12) United States Patent
Chea, Jr. et al.

(10) Patent No.: US 6,553,105 B2
(45) Date of Patent: Apr. 22, 2003

(54) ENABLING AND POWERING OF REMOTELY ACTUATED BYPASS SPLITTERS

(75) Inventors: Ramon C. W. Chea, Jr., San Jose, CA (US); P. Kingston Duffie, Palo Alto, CA (US)

(73) Assignee: Turnstone Systems, Inc., Santa Clara, CA (US)

( * ) Notice: Subject to any disclaimer, the term of this patent is extended or adjusted under 35 U.S.C. 154(b) by 0 days.

(21) Appl. No.: 10/137,083

(22) Filed: Apr. 30, 2002

(65) Prior Publication Data

US 2002/0131568 A1 Sep. 19, 2002

Related U.S. Application Data

(62) Division of application No. 09/516,345, filed on Mar. 1, 2000.

(51) Int. Cl.[7] .......................... H04M 11/00; H04M 1/24
(52) U.S. Cl. .............................. 379/93.14; 379/93.09; 379/9
(58) Field of Search ................. 379/93.14, 93.05–93.09, 379/102.01, 102.02, 1.04, 9, 22, 27.01, 27.06, 29.01, 414, 242, 268

(56) References Cited

U.S. PATENT DOCUMENTS

| | | |
|---|---|---|
| 5,757,803 A | 5/1998 | Russell et al. .............. 370/494 |
| 5,848,150 A | 12/1998 | Bingel ........................ 379/399 |
| 5,930,340 A | 7/1999 | Bell ......................... 379/93.08 |
| 5,960,036 A | 9/1999 | Johnson et al. ............. 375/219 |
| 5,974,139 A | 10/1999 | McNamara et al. ......... 379/399 |
| 5,982,785 A | 11/1999 | Woerner et al. ............ 370/488 |
| 6,005,873 A | 12/1999 | Amit .......................... 370/494 |
| 6,091,722 A | 7/2000 | Russell ....................... 370/352 |
| 6,144,735 A | 11/2000 | Bella .......................... 379/399 |
| 6,181,775 B1 | 1/2001 | Bella ........................ 379/29.01 |
| 6,266,348 B1 | 7/2001 | Gross et al. ................. 370/493 |
| 6,470,074 B2 * | 10/2002 | Teixeria ................... 379/32.04 |
| 6,480,575 B2 * | 11/2002 | Chea, Jr. et al. ................ 379/9 |

* cited by examiner

*Primary Examiner*—Wing Chan
(74) *Attorney, Agent, or Firm*—Pillsbury Winthrop LLP

(57) ABSTRACT

The present invention is directed to a remotely actuated splitter bypass function (RASB) working in conjunction with a test head at the central office for testing and maintaining copper loops in the digital subscriber line environment. The RASB allows a competitive local exchange carrier to test and maintain the xDSL portion of the copper loop with minimal interference and disturbance to/from the plain old telephone system (POTS) service by bypassing the central office splitter. The splitter bypass operation includes the steps of selecting a copper loop pair for testing, actuating a first relay for monitor mode, actuating a second relay for bypass mode, testing the selected copper loop, and resetting the first and second relays back to normal mode. By applying positive and negative voltages from the tip and ring with respect to ground, various relays can be set (actuated) and reset to provide multiple modes of operations. In this manner, relays can be designed to respond in certain voltage levels and polarities.

7 Claims, 15 Drawing Sheets

ENABLING AND POWERING OF REMOTELY ACTUATED BYPASS SPLITTERS

This is a divisional application of U.S. Ser. No. 09/516,345 filed Mar. 1, 2000.

FIELD OF THE INVENTION

The present invention relates to a remotely actuated splitter bypass system and method for testing and maintaining a copper loop. More particularly, the present invention is directed to a system and method for remotely actuating a bypass function in a splitter such that testing and maintenance can be performed by a local exchange carrier without interference to/from the plain old telephone system (POTS) service. In particular, the present invention discloses systems and methods allowing a competitive local exchange carrier (CLEC) to access the copper loop for testing and maintenance with minimal interference to/from the POTS service.

BACKGROUND OF THE INVENTION

In 1999, the Federal Communications Commission (FCC) adopted rules to promote competition between local telephone companies and providers of high speed Internet access and other data services by directing the telephone companies to share their telephone lines with such providers. With these rules, many companies can deploy new technologies on a faster, more cost-effective basis, thereby allowing residential and business customers to access broadband and POTS services from a choice of different providers.

Digital Subscriber Line or xDSL is one of the most promising new technologies for delivering superior service and higher speed connections over existing infrastructure. Recent changes in the telecommunications industry such as the deregulation of local markets have brought on the emergence of new technologies such as xDSL. In addition, the growing demand for faster, more reliable Internet access has increased the demand for technologies that deliver higher speed connections over existing infrastructure.

As known, different competing forms of digital subscriber line technologies are collectively designated as xDSL technologies with the "x" representing various one or more letter combinations, which are used in front of the "DSL" acronym to designate the type of technology being used. Some of the more prevalent xDSL technologies include HDSL, ADSL, SDSL, RADSL, VADSL, and VDSL.

xDSL uses the existing copper loop that is traditionally used for conventional telephony to deliver data at high bandwidth. Currently, the transmission rates for xDSL technologies are dependent on the distance between a central office and a particular customer. Depending on the type of xDSL technology, the transmission rate downstream to the customer and upstream to the central office may vary. Also, xDSL uses packet switching technology that operates independently of the voice telephone system, allowing telephone companies to provide Internet service and not lock up circuits for telephone calls. xDSL can carry both voice and data signals simultaneously, in both directions, allowing the customer to log onto the Internet and make a telephone call at the same time. Thus, it is easy to understand why xDSL is becoming the preferred system and method for sending/receiving analog and digital data/signals in the telecommunications industry.

Traditionally, incumbent local exchange carriers (ILECs) used the existing copper loop for voice telephone and data services. With the adoption of the new FCC rules, competitive local exchange carriers (CLECs) can obtain access to the high-frequency portion of the local loop from the ILECs. This enables the CLECs to provide xDSL services over the same telephone lines simultaneously used by the ILECs, which technique is know as "line sharing."

Line sharing allows customers to obtain data service from either the ILEC or CLEC without having to forego the traditional voice service from their current provider. Line sharing also allows customers to receive both voice and data services on the same line; thus, eliminating the need for customers to procure a second line. In other words, line sharing involves the CLEC providing xDSL service on the same copper loop on which the ILEC provides POTS service. As a result, this allows for a more efficient use of the existing telephone infrastructure by allowing CLECs to take advantage of the large installation base that already exists.

One major shortcoming of the current line sharing system and method is the testing and maintenance of the copper loop for the CLECs. This problem is better understood by describing the current line sharing system and method, which is described in greater detail with reference to FIGS. 1–2.

FIG. 1 illustrates a simplified diagram of a conventional line sharing system. In the conventional system, a central office (CO) is connected to a customer's telephone 16 and an ATU-R (ADSL transceiver remote unit) 18 or similar end unit at the customer's premise (home, office, etc.) using a copper loop 14 (pair of copper wires). In the CO, a voice switch 2, which is generally owned by the ILEC, and a DSLAM (DSL Access Multiplexers) 4, which in this case is owned by the CLEC, are connected to a CO splitter 6. As known, the voice switch 2 includes circuitry for providing POTS (voice) service and the DSLAM 4 includes circuitry for providing xDSL service to the customer. The DSLAM 4 generally receives incoming xDSL lines and aggregates the traffic onto high-speed uplink trunks such as ATM or Frame Relay. The CO splitter 6 is typically found in a main distribution frame and is generally a passive unit (i.e., no power).

In greater detail, the CO splitter 6 is used to isolate the voice service from the xDSL service. The isolation generated by the CO splitter 6 is important for minimizing interference between the two types of services and removing transients. The CO splitter 6 separates voice and data band signals received from the copper loop 14 and provides the respective signals to the voice switch 2 and the DSLAM 4. The CO splitter 6 also combines the voice and data band signals received from the voice switch 2 and the DSLAM 4 and provides the combined signals to the copper loop 14.

The CO splitter 6 includes a low pass filter (LPF) 8 connected to the voice switch 2 and a high pass filter (HPF) 10 (or DC clocking capacitors) connected to the DSLAM 4. The LPF 8 filters out higher band xDSL signals and prevents such signals from interfering with the voice switch 2. Likewise, the HPF 10 filters out low band voice signals and prevents such signals from interfering with the DSLAM 4. In other words, the high frequency signals generated by the DSLAM 4 will not interfere with the voice switch 2 because of the LPF 8, and the low frequency signals generated by the voice switch 2 will not interfere with the DSLAM 4 because of the HPF 10. The voice service typically occupies the band between 0 KHz (DC) to 4 KHz, and the xDSL service occupies some predetermined band above the voice service such as from 25.9 KHz to 1.1 MHz.

A signature S1 12 is also connected to the voice portion of the CO splitter 6. As known, the signature can be used in conjunction with a CO test system for fault identification and localization. The signature S1 12 is preferably a passive network such as a resistance, capacitor, zeners and diodes combined to from a unique network, which is used to assist in detecting fault conditions, loop length measurements, and the like. The signature S1 12 can also be active circuit elements that perform a specific function, as known in the art.

A second remote (RT) splitter 20 having a LPF 22, HPF 24, and signature SR 26 can be optionally installed in the customer's premise. The LPF 22 is connected to the telephone 16 for filtering out high band signals, while the HPF 24 is connected to the ATU-R 18 for filtering out low band signals.

FIG. 2 illustrates a diagram of an existing circuit used in the conventional line sharing system as shown in FIG. 1. The LPF 8 generally includes series inductors 30–35 and capacitors 42, 44, while the HPF 10 generally includes series capacitors 50–53 and inductors 60, 62.

The voice switch 2 typically includes circuitry for interfacing with a pair of wires, tip and ring, from the outside plant. As is well known, tip and ring are terms used to describe the two wires that are used to set up a telephony/xDSL connection. The voice switch 2 includes amplifiers 73, 74, connected in series to resistors 71, 72, respectively. The amplifiers 73, 74, and resistors 71, 72, form a balance drive interface circuit to the tip and ring wires. As known, the voice switch 2 can be implemented with transformers instead of amplifiers 73, 74. The DSLAM 4 includes a pair of capacitors 81, 82 connected in parallel.

With the conventional line sharing system and CO splitter 6 as shown in FIGS. 1–2, the ILEC using the voice switch 2 can continue to test and maintain the copper loop in the traditional manner, typically using mechanized loop testing via a Class 5 switch. The LPF 8 in the CO splitter 6 does not significantly interfere with this process. However, it is well known that the CLEC's ability to test and maintain the copper loop for xDSL service is greatly handicapped using the conventional CO splitter 6 because of the HPF 10 and the POTS service. Thus, it is very difficult for the CLEC to access the copper loop for independent testing and maintenance.

Another disadvantage using the conventional system and method is that the CO splitter 6 is typically implemented in a manner that benefits the ILECs, which utilize their customized test systems to test and maintain the POTS portion of the copper loop. The CLECs, which are typically in direct competition with the ILECs for xDSL service, currently do not have a system and method for independent testing/maintenance of the copper loop. For example, when the ILEC uses the copper loop for voice service, the CLEC is generally prohibited from testing the copper loop in fear of disturbing or interfering with the voice service. If the copper loop is busy or off-hook (i.e., customer using the telephone), the CLEC will be very hesitant to test the copper loop because such testing may terminate the telephone call.

As described above, the conventional CO splitter is generally acceptable for the ILECs for testing the copper loop for voice service, but it is inadequate for the CLECs for testing the same loop for xDSL service. Accordingly, there is a need for a system and method for providing a reliable and effective manner of testing and maintaining the copper loop in the xDSL environment for CLECs. Thus, there is a need for a remotely actuated splitter bypass system and method for improved testing and maintenance of the copper loop for the CLECs without interference or disturbance to/from the POTS service.

SUMMARY OF THE INVENTION

In view of the above-described problems of the prior art, it is an object of the present invention to provide a remotely actuated splitter bypass system and method.

It is another object of the present invention to provide a system and method for implementing a remotely actuated splitter bypass function in the existing line sharing infrastructure for improved testing and maintenance for a CLEC.

It is yet another object of the present invention to provide circuitry allowing a CLEC to access the copper loop for testing and maintenance with minimal interference and disturbance to/from the POTS service.

It is a further object of the present invention to provide a system and method for providing a reliable and effective manner for testing and maintaining a copper loop in the xDSL environment for a CLEC.

It is still a further object of the present invention to provide a system and method for remotely actuating a bypass function in a splitter such that testing and maintenance can be performed by a CLEC without interference or disturbance to/from the POTS service.

It is another object of the present invention to provide controls signals that are carried by the same copper loop pair during testing.

It is yet another object of the present invention to provide an enable signal to enable multiple pairs of copper loops and when the enable signal is absent, all splitters automatically revert to the normal mode of operation.

It is a further object of the present invention for providing a method for remotely actuating a bypass function in a splitter using a direct control approach.

It is yet another object of the present invention for providing a method for remotely actuating a bypass function in a splitter using a state machine control approach.

These and other objects of the present invention are obtained by providing a remotely actuated splitter bypass (RASB) function that can be used with a conventional splitter in the current line sharing system. The RASB includes circuitry, working in conjunction with an off-the-shelf splitter, for testing and maintaining a copper loop by a CLEC with minimal interference and disturbance to/from the POTS service. The splitter bypass operation includes the steps of selecting a copper loop pair for testing, actuating a first relay for monitor mode, actuating a second relay for bypass mode, testing the selected copper loop, and resetting the first and second relays back to normal mode. The RASB can be implemented using direct control or state machine control.

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
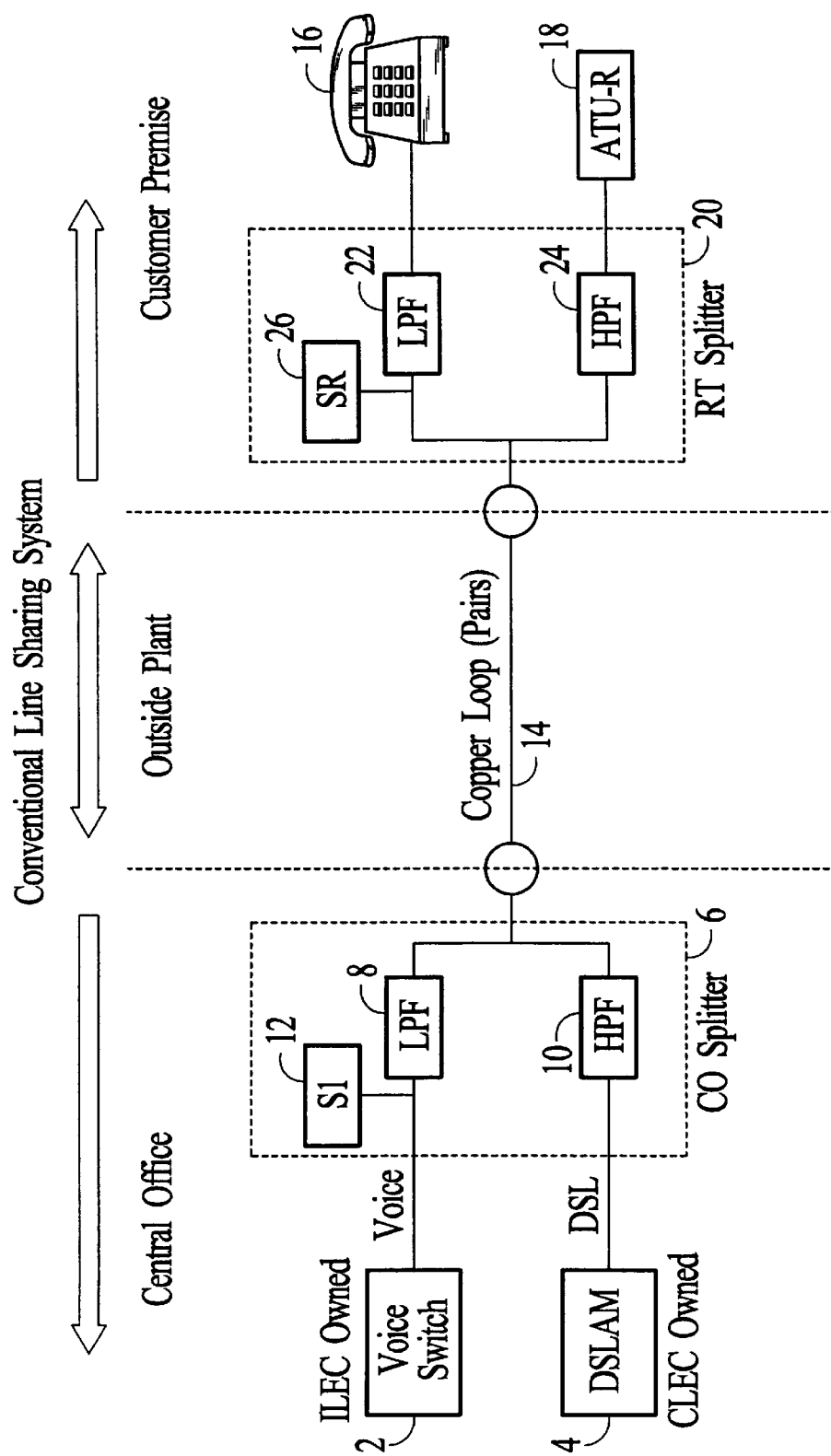
FIG. 1 illustrates a simplified block diagram of a conventional line sharing system having a splitter.
Figure 2:
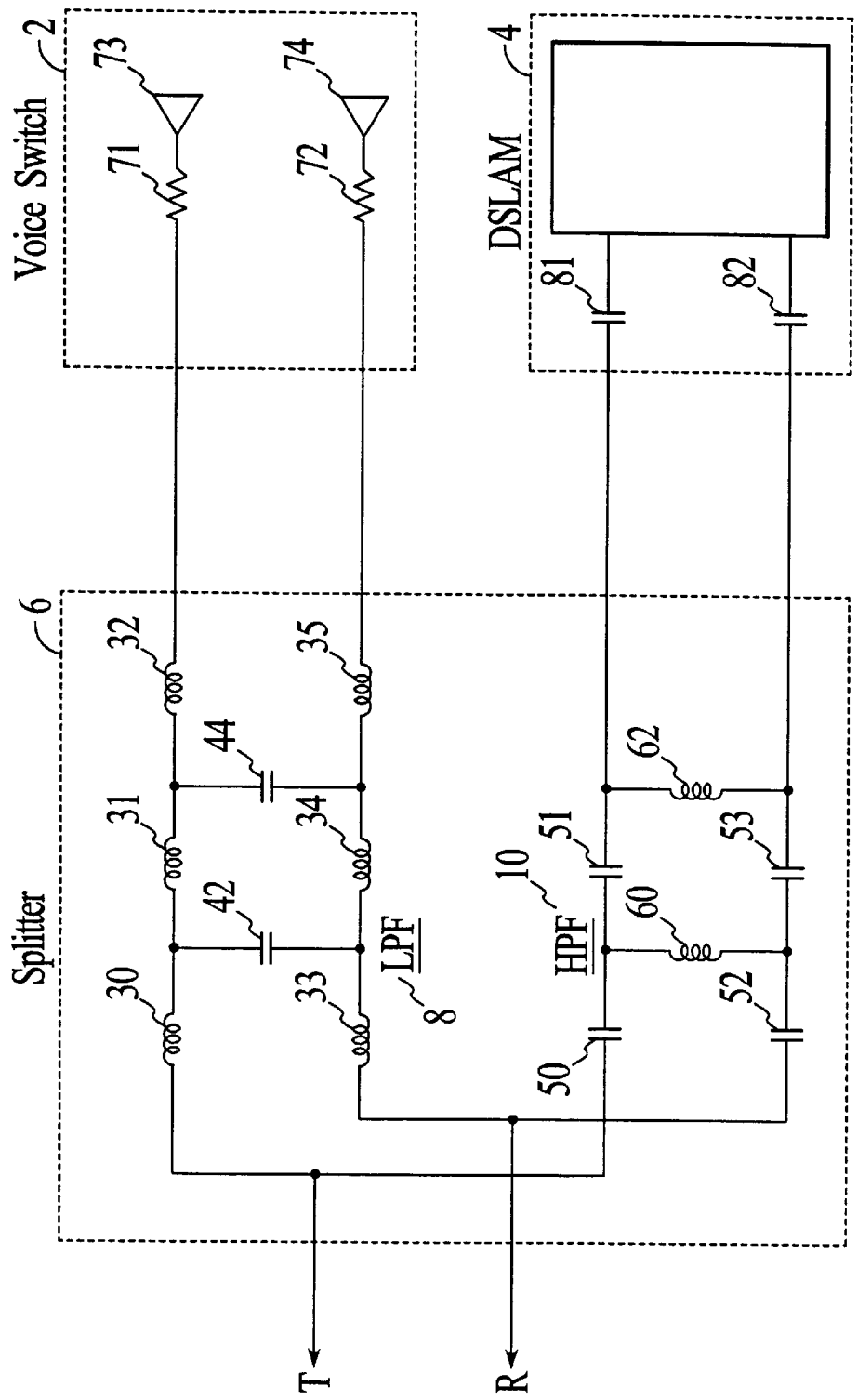
FIG. 2 illustrates a diagram of an existing circuit used in the conventional line sharing system as shown in FIG. 1.

The present invention will now be described in greater detail, which will serve to further the understanding of the preferred embodiments of the present invention. As described elsewhere herein, various refinements and substitutions of the various embodiments are possible based on the principles and teachings herein.

The preferred embodiments of the present invention will be described with reference to FIGS. 3–6, wherein like components and steps are designated by like reference numerals throughout the various figures. Further, specific parameters such as potential differences, voltage values, circuit layouts, and the like are provided herein, and are intended to be explanatory rather than limiting.

The present invention is directed to a remotely actuated splitter bypass (RASB) function/unit for testing and maintaining copper loops in an xDSL environment. In the context of this invention, the term "remotely" is defined to be anywhere outside the central office splitter. In other words, the present invention allows a CLEC to remotely actuating a bypass function in the CO splitter such that testing and maintenance can be performed with minimal interference and disturbance to/from the POTS service. Alternatively, the CLEC can actuate the bypass function within the CO splitter on-site. The RASB can be implemented in two preferred embodiments, direct control and state machine control.

Figure 3A:
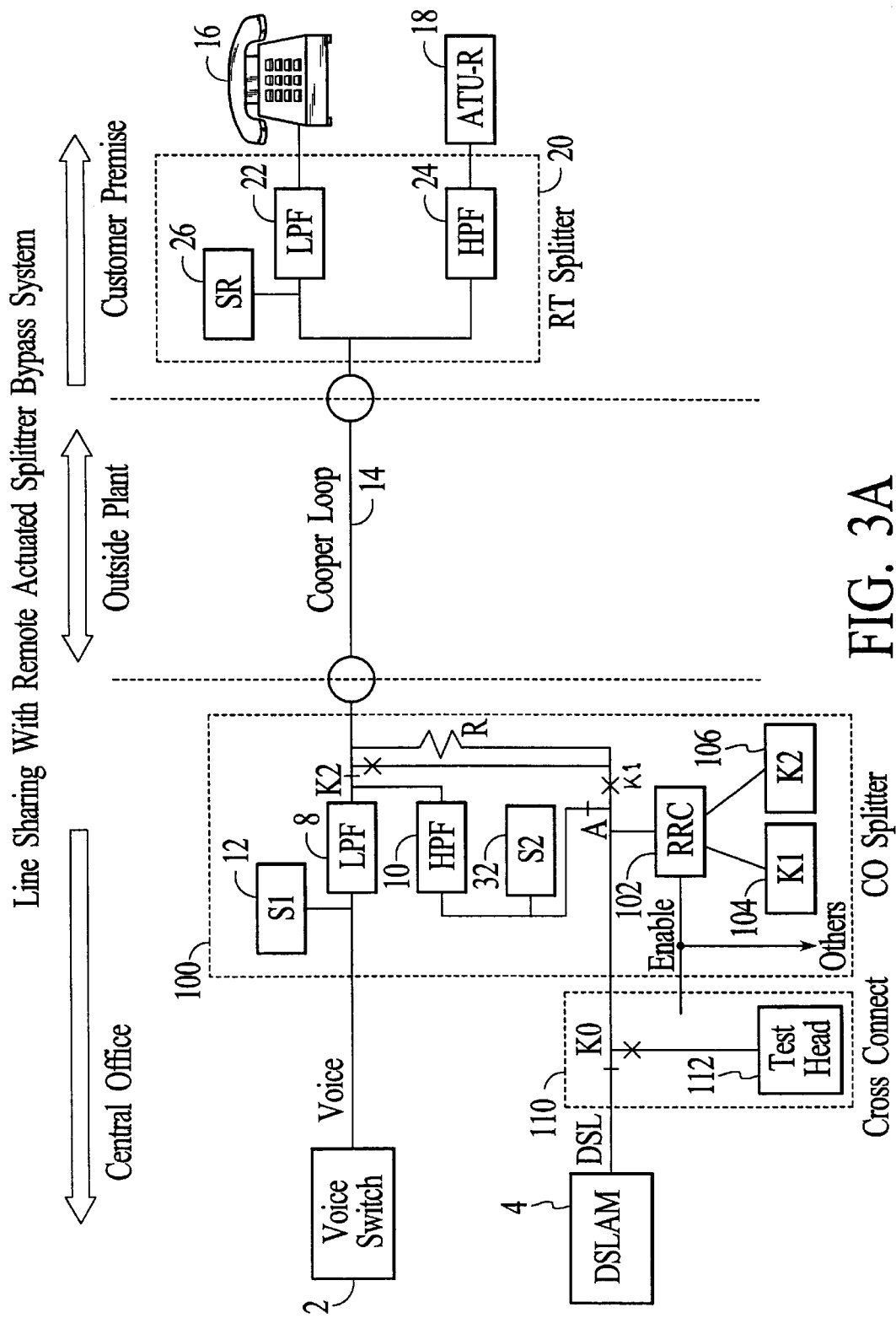
FIG. 3A illustrates a block diagram of a line sharing system having a splitter with a remotely actuated splitter bypass function in accordance with the preferred embodiments of the present invention.

FIG. 3A illustrates a block diagram of a line sharing system having a CO splitter with a RASB function in accordance with the preferred embodiments of the present invention. In this system, the CO is connected to the customer's telephone 16 and the ATU-R 18 or similar end unit at the customer's premise using the copper loop 14. In the CO, the voice switch 2 and the DSLAM 4 are connected to a CO splitter 100.

Positioned in between the DSLAM 4 and the CO splitter 100 at the CO is a cross connect unit 110 such as the CX100 Copper CrossConnect System from Turnstone Systems, Inc. The CX100 Copper CrossConnect System is a platform that automates the physical layer infrastructure in the CO, enabling ILECs and CLECs to remotely control, test, and manage the copper loop 14. Additional information regarding Turnstone System's CX100 Copper CrossConnect System can be found at the web site trunstone.com, which contents are herein incorporated by reference. It is also noted that other units providing similar functionalities as the CX100 Copper CrossConnect System can be implemented in the present invention.

The cross connect 110 includes a test head 112 with a conventional processor board such as a P150 processor (e.g., CX100 Copper CrossConnect System of Turnstone Systems, Inc.). A relay K0 or equivalent functional element can be used to connect the test head 112 to the copper loop 14, as described in greater detail later herein. The CO splitter 100 of the present invention includes the LPF 8, HPF 10, and first signature S1 12, similar to that of the prior art CO splitter 6. In addition, the CO splitter 100 includes a first relay K1 or equivalent element, second relay K2 or equivalent element, resistor R, and second signature S2 32. Further included in the CO splitter 100 in between the relay K0 of the cross connect 110 and the first relay K1 is a remote relay control (RRC) 102. The RRC 102 is connected to the xDSL portion of the loop at point A (part of the tip and ring wires) and controls the first and second relays K1, K2. A more detailed description and circuit diagrams of the RRC 102 are provided later herein.

The LPF 8 is connected to the voice switch 2, and the HPF 10 is connected to the DSLAM 4 via relays K0, K1. The first signature S1 12 and the second signature S2 32 are also connected to the voice and xDSL portions of the copper loop, respectively. During operation, an enable signal (ENABLE), which preferably carries very low power and is common to n number of splitters, from the cross connect 110 is sent to the CO splitter 100 and n number (i.e., 50, 100, etc.) of splitters (OTHERS). In the context of the Turnstone System's CX100 Copper CrossConnect System, n is preferably 550, but other arbitrary number of copper loops can be used depending on the type of cross connect used. The RRC 102 is implemented per each copper loop.

Figure 3B:
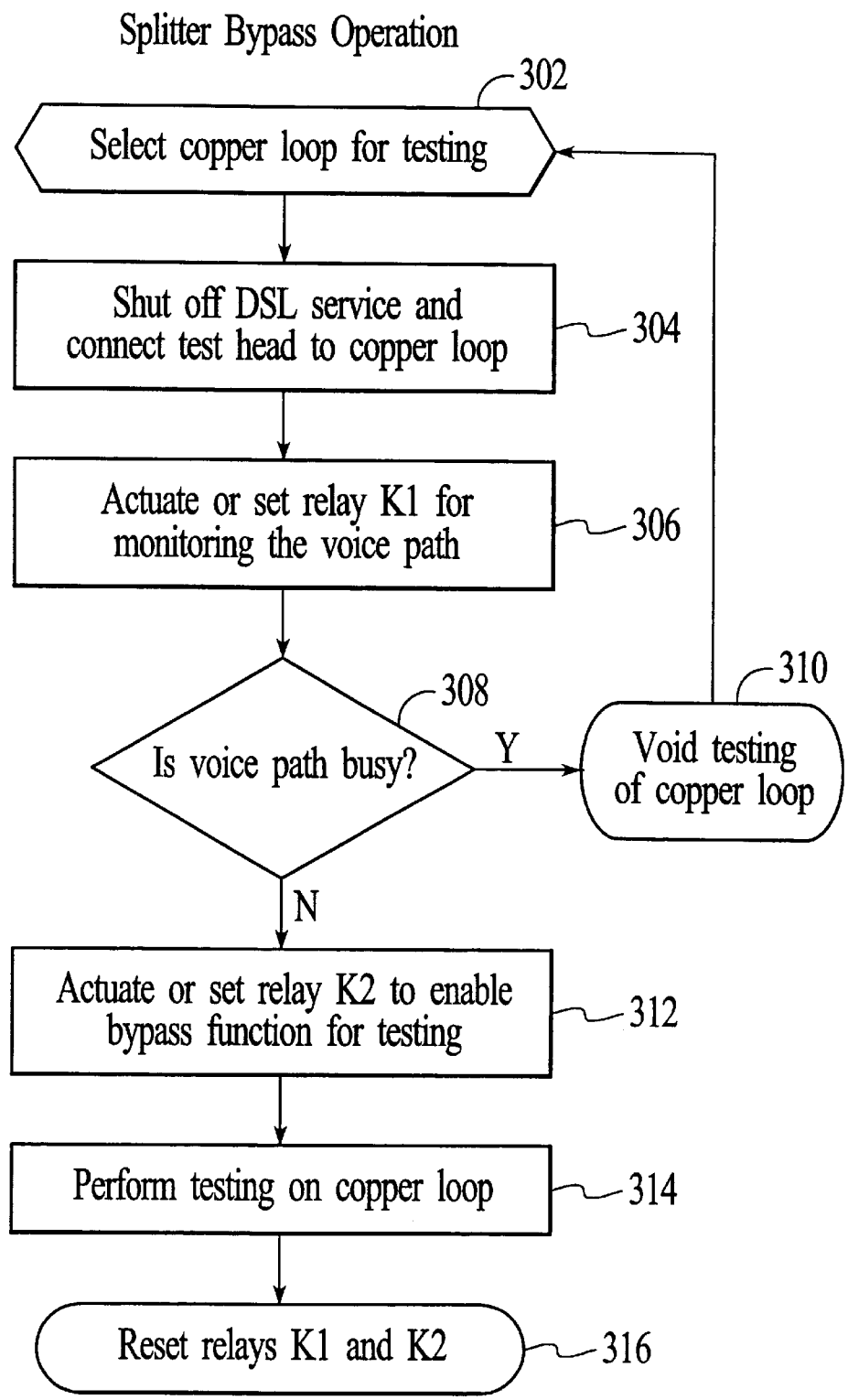
FIG. 3B illustrates a flow diagram showing the splitter bypass operation in accordance with the preferred embodiments of the present invention.

FIG. 3B illustrates a flow diagram showing the splitter bypass operation in accordance with the preferred embodiments of the present invention. Reference will be made to both FIGS. 3A and 3B concurrently for a more complete understanding of the present system and method.

Figure 3C:
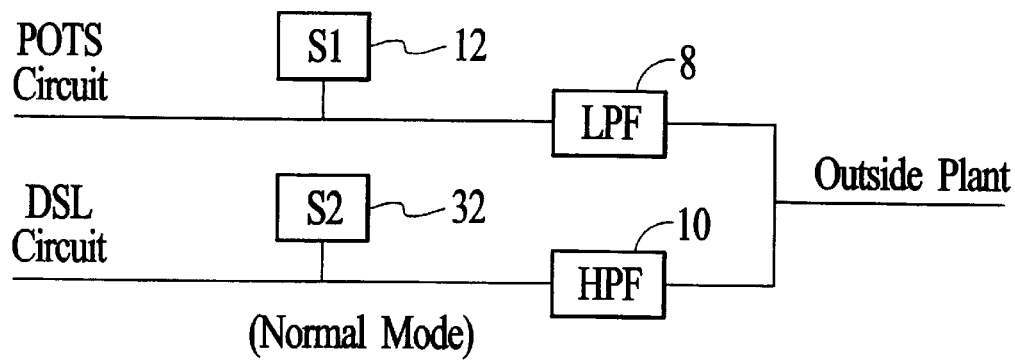
FIG. 3C illustrates a simplified block diagram representing the normal mode in accordance with the preferred embodiments of the present invention.

The steps described in FIG. 3B illustrate the method of testing the copper loop 14 for the CLEC using the RASB of the present invention. Although other modes of operation are possible using the present invention, for simplicity, three modes are described: normal, monitor, and bypass. These three modes are described in greater detail with reference to FIGS. 3C–3E. For example, FIG. 3C illustrates a simplified block diagram of FIG. 3A representing the normal or default mode. The LPF 8 and HPF 10 are connected to the copper loop in the traditional splitter arrangement, similar to that described in the background section.

Referring back to FIG. 3B, the CLEC uses the test head 112 to select a copper loop 14 pair from n number of copper loop pairs for testing in step 302. When the CLEC has selected the copper loop 14, xDSL service is temporarily shut off, and the test head 112 is connected to the copper loop 14 via the relay K0 in step 304, thereby disconnecting the copper loop 14 from the DSLAM 4. The relays described herein can be switched via software, hardware, or combinations thereof, but in certain embodiments as described later herein, the relays are controlled via hardware functions.

In step 306, the first relay K1 is actuated (set) via RRC 102 for monitoring the voice path to determine whether the bypass function should be activated. This is accomplished by measuring the voltage on the copper loop 14 in a non-intrusive manner. As known, different voltage values across the copper loop 14 indicate whether the loop is off-hook (busy) or on-hook. The resistor R in the CO splitter 100 minimizes interference to the copper loop 14 during this process. The resistance value is selected such that the generated noise from actuating the first relay K1 is acceptable. Generally, the resistor R has a high ohm value (>100k ohms) to allow monitoring without any material disturbance to the copper loop 14 (i.e., provides stability). The first relay K1 can be either a latching or non-latching relay, depending on the specific preferred embodiment.

Figure 3D:
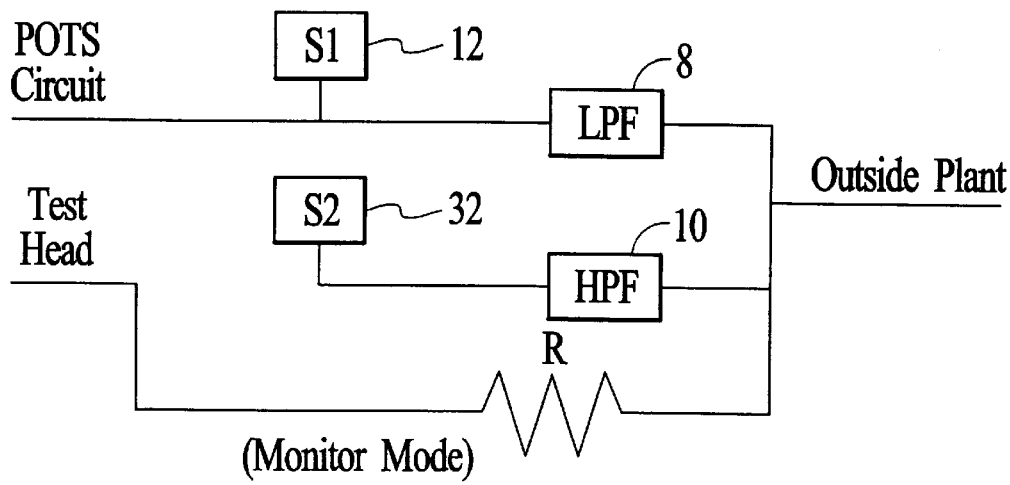
FIG. 3D illustrates a simplified block diagram representing the monitor mode in accordance with the preferred embodiments of the present invention.

FIG. 3D illustrates a simplified block diagram representing the monitor mode of the present invention. During the monitor mode (step 306), the POTS service is unaffected, and the test head 112 is connected to the copper loop 14 while isolating the HPF 10. As discussed above, the test head 112 is bridged through the resistor R to assure minimal interference to the POTS service. In the monitor mode, the CLEC can check the DC and voice band frequencies for an off-hook or on-hook condition so that testing can be performed on the copper loop without interfering with an active POTS telephone call.

In step 308, if the voice path is determined to be off-hook, then testing is avoided in step 310. On the other hand, if the voice path is on-hook in step 308, then the second relay K2 is actuated (set) via RRC 102 to enable the bypass function for testing in step 312.

Figure 3E:
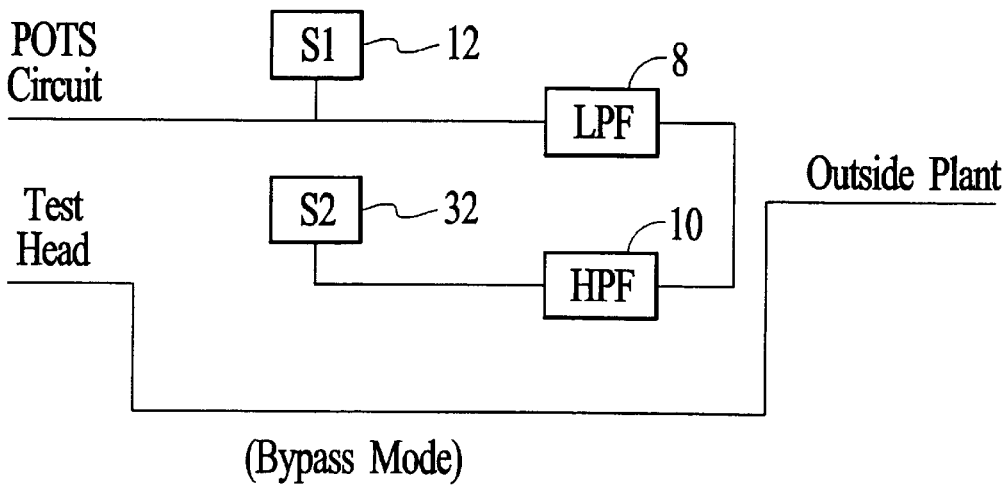
FIG. 3E illustrates a simplified block diagram representing the bypass mode in accordance with the preferred embodiments of the present invention.

FIG. 3E illustrates a simplified block diagram representing the bypass mode of the present invention. In the bypass mode (step 312), the POTS service is disconnected from the copper loop, and the xDSL service is reconnected directly to the copper loop. As illustrated, the LPF 8, HPF 10, signatures S1 12, S2 32 are isolated from the rest of the circuit during the bypass mode. In this manner, the CLEC can obtain full access to the copper loop 14 in the outside plant for testing without interference to/from the LPF 8, HPF 10, and/or the voice switch 2. When the second relay K2 is actuated, testing is performed for a predetermined period (i.e., 30 seconds) via the test head 112 in step 314. The resistor R is shorted out during the bypass mode, and testing is performed during the bypass mode.

Preferably, the second relay K2 is a non-latching type relay. It is important that the second relay K2 is non-latching because this provides a fail-safe design in case power is lost as the system automatically resets back to the normal mode. This aspect of the invention is described in more detail later herein. Once testing is completed, the first and second relays K1, K2 are reset in step 316 via RRC 102 to normal mode and the signature S2 32 is checked in step 316. The signature S2 could also be checked before step 306; however, this may cause noise interference during a busy POTS call.

Figure 4:
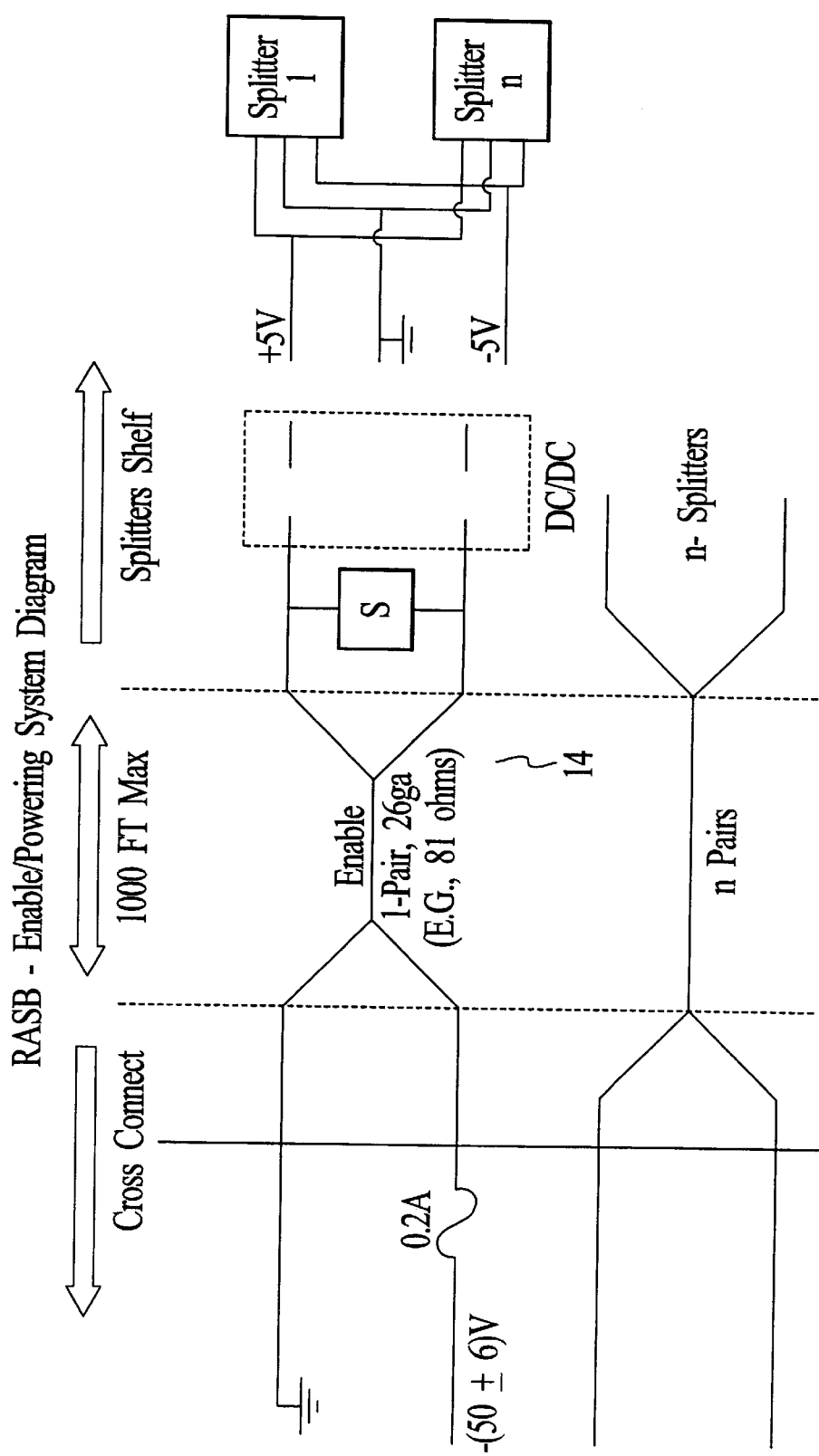
FIG. 4 illustrates an enable/powering system diagram in accordance with the preferred embodiments of the present invention.

FIG. 4 illustrates an enable/powering system diagram in accordance with the preferred embodiments of the present invention. In the CO, one copper loop pair from n pairs (where n is some arbitrary number) is used to transmit enable signals from the test head to the RRC and n number of CO splitters. Preferably, only one of n splitters is allowed to be in active bypass mode per test head. In this specific example, it is assumed that one copper loop pair is 26 gauge and that the distance from the cross connect 110 to a splitter shelf is a maximum of 1000 feet. It is also assumed that a standard CO battery voltage of 50±6 is used in this implementation.

A signature S is used to assure that the correct copper loop pair is hooked up before switching on the power source. The cross connect 110 will check the signature S before the enable signal is generated. The enabled copper loop terminates with a 5W, ±5 V DC/DC, and the average power per splitter allocation is approximately 24 mV (2.4 mA for ±5V). The ±5V could be used to power the circuitry for the n number of splitters.

As described above, the RASB method and system of the present invention can be implemented in two preferred embodiments, using a direct control approach and a state machine approach. FIGS. 5A–5D illustrate the first preferred embodiment, and FIGS. 6A–6F illustrate the second preferred embodiment of the present invention. Referring back to FIG. 3A, these two preferred embodiments relate to the design and the implementation of the control signals to the first and second relays K1, K2 using the RRC (remote relay control) 102. Thus, design implementation of the LPF 8, HPF 10, signature S1 12, and signature S2 32 will not be discussed in great detail hereinafter, as these components are known in the prior art. Further, although the CO splitter described herein is implemented with two relays, it is understood that more or less than two relays in the CO splitter can be used herein and is within the scope of the present invention.

Figure 5A:
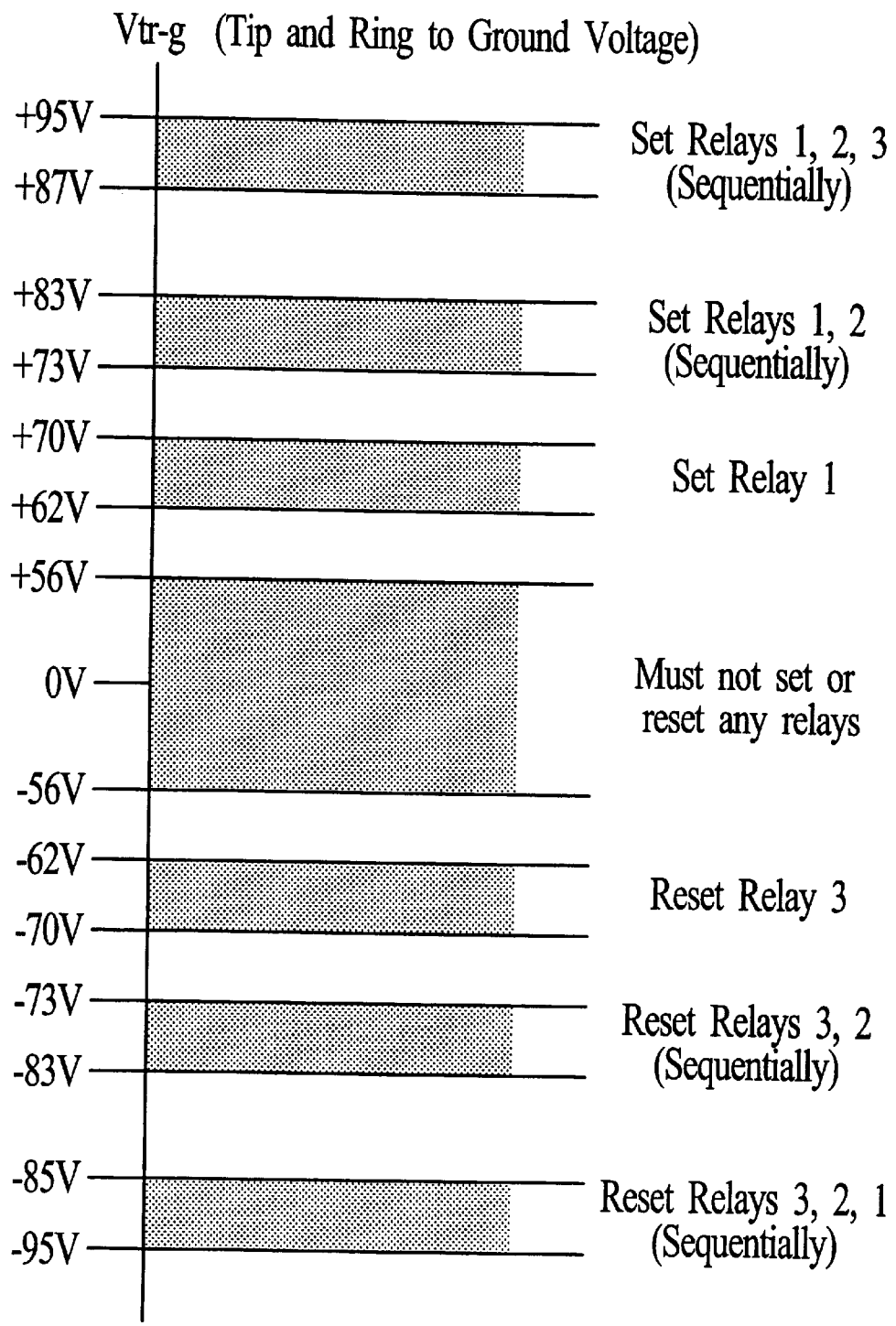
FIG. 5A illustrates a specific example of the remotely actuated splitter bypass signaling definition in accordance with the first preferred embodiment of the present invention.

FIG. 5A illustrates a specific example of the RASB signaling definition in accordance with the first preferred embodiment of the present invention. As known, a power source in the CO can be connected to the tip, ring, and/or ground wires. In the present invention, voltages are applied to the tip and ring wires with respect to the ground wire.

In the first preferred embodiment, relays are "set" or actuated when an appropriate positive voltage magnitude is applied from tip and ring wires with respect to the ground wire. Conversely, relays are "reset" when an appropriate negative voltage magnitude is applied from tip and ring wires with respect to the ground wire. The polarity of the voltages for set and reset conditions can be interchangeable by a person skill in this art (i.e., set having negative polarities and reset having positive polarities).

In greater detail, each relay can be set with a positive polarity, using some arbitrary voltage range, which range is pre-defined/pre-designed. Conversely, each relay can be reset with a negative polarity, using some arbitrary voltage range, which range again is pre-defined/pre-designed. In additional, a particular voltage range that sets a particular relay or relays includes a reciprocal voltage range to reset another relay or relays. For example, one can set relay K1 in the +62 to +70 voltage range, and reset the relay K3 using the −62 to −70 voltage range. In another example, relays K1 and K2 can be set using the +73 to +83 voltage range, and relays K3 and K2 can be reset using the −73 to −83 voltage range, respectively. In this manner, multiple relays can be remotely actuated from the CO by providing different voltages and polarities. It is also noted that in FIG. 5A, the voltage ranges and polarities are for illustrative purposes only and other practical voltage ranges and polarities can be substituted for those illustrated.

The signaling definition allows the relays to be set sequentially such that relay K1 is set first and then relay K2, and so on. For example, it is important that relay K1 is set first for monitor mode before setting relay K2 for bypass mode. This is accomplished by setting the relay K1 in a lower voltage range than relay K1. Likewise, the relays are sequentially reset such that relay K2 is reset first and then relay K1, and so on. This is accomplished by resetting relay K1 in a higher absolute magnitude voltage range than relay K2. This assures that the signaling path is not cut off pre-maturely during the relays' setting and resetting processes. In other words, the present schema allows the first set relay K1 to be the last reset relay K1, and the last set relay K3 to be the first reset relay K3.

Figure 5B:
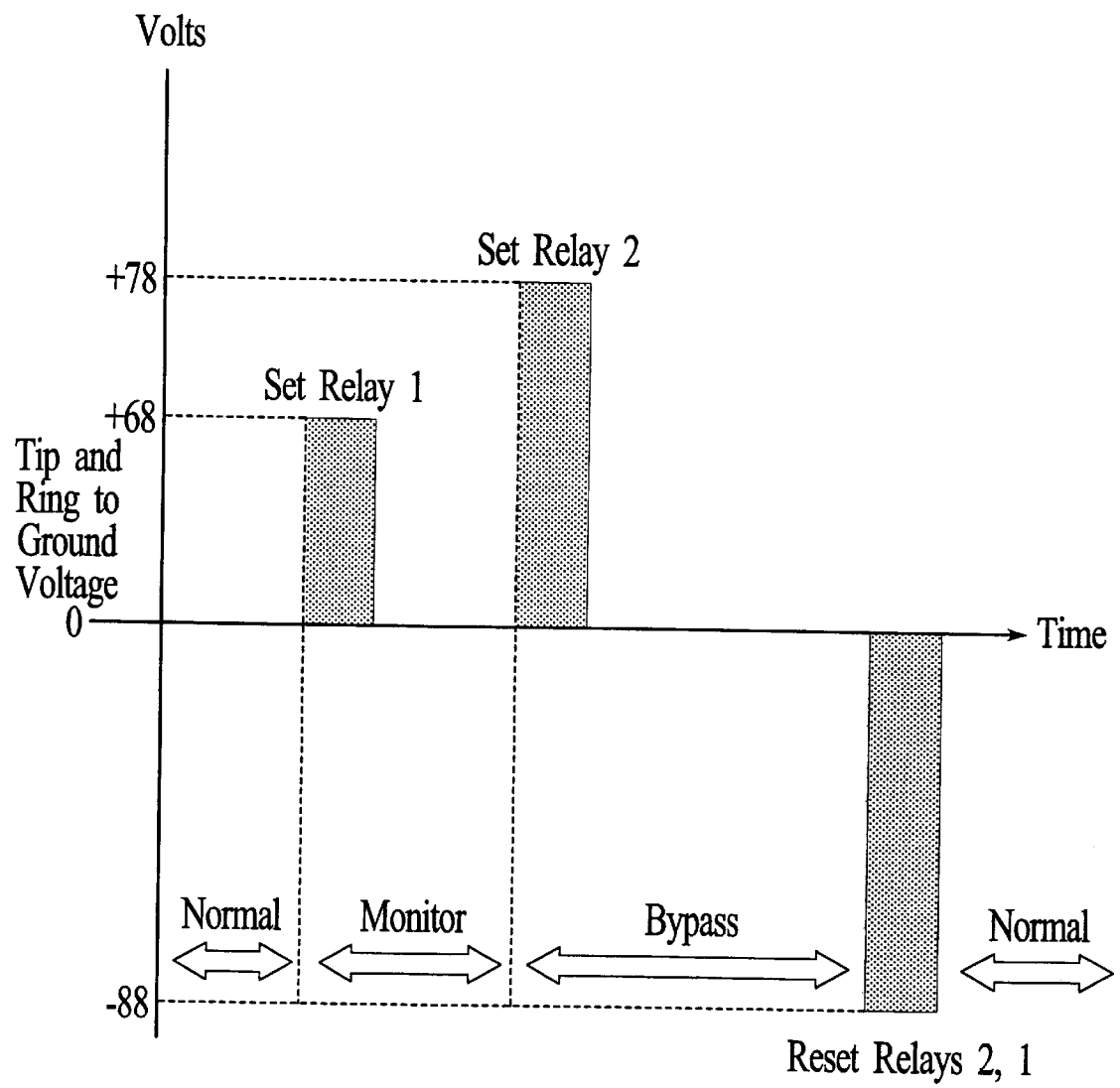
FIG. 5B illustrates a signaling sequence of FIG. 5A in accordance with the first preferred embodiment of the present invention.

FIG. 5B illustrates a signaling sequence of FIG. 5A in accordance with the first preferred embodiment of the present invention. As shown in FIG. 5B, the circuit is generally in normal mode, which mode refers to the traditional line sharing system.

When copper loop testing is initiated from the xDSL circuit, the selected copper loop pair is connected to the test head. A first signal (e.g., +68 volts) is used to set relay K1. When the relay K1 is set, this indicates the monitor mode. The copper loop is connected to the test head through resistor R. The test head checks for DC voltage and voice band signals for monitoring whether the copper loop is off-hook or on-hook. If off-hook, the system aborts accessing this loop for testing. If it is on-hook, a second signal (e.g., +78 volts) is used to set the second relay K2, which provides the test head direct access to the copper loop while bypassing the CO splitter. This puts the system in the bypass mode, which enables loop testing by the test head. When loop testing is completed, a third voltage signal (e.g., −88V) is used to reset the relays back to normal mode.

Figure 5C:
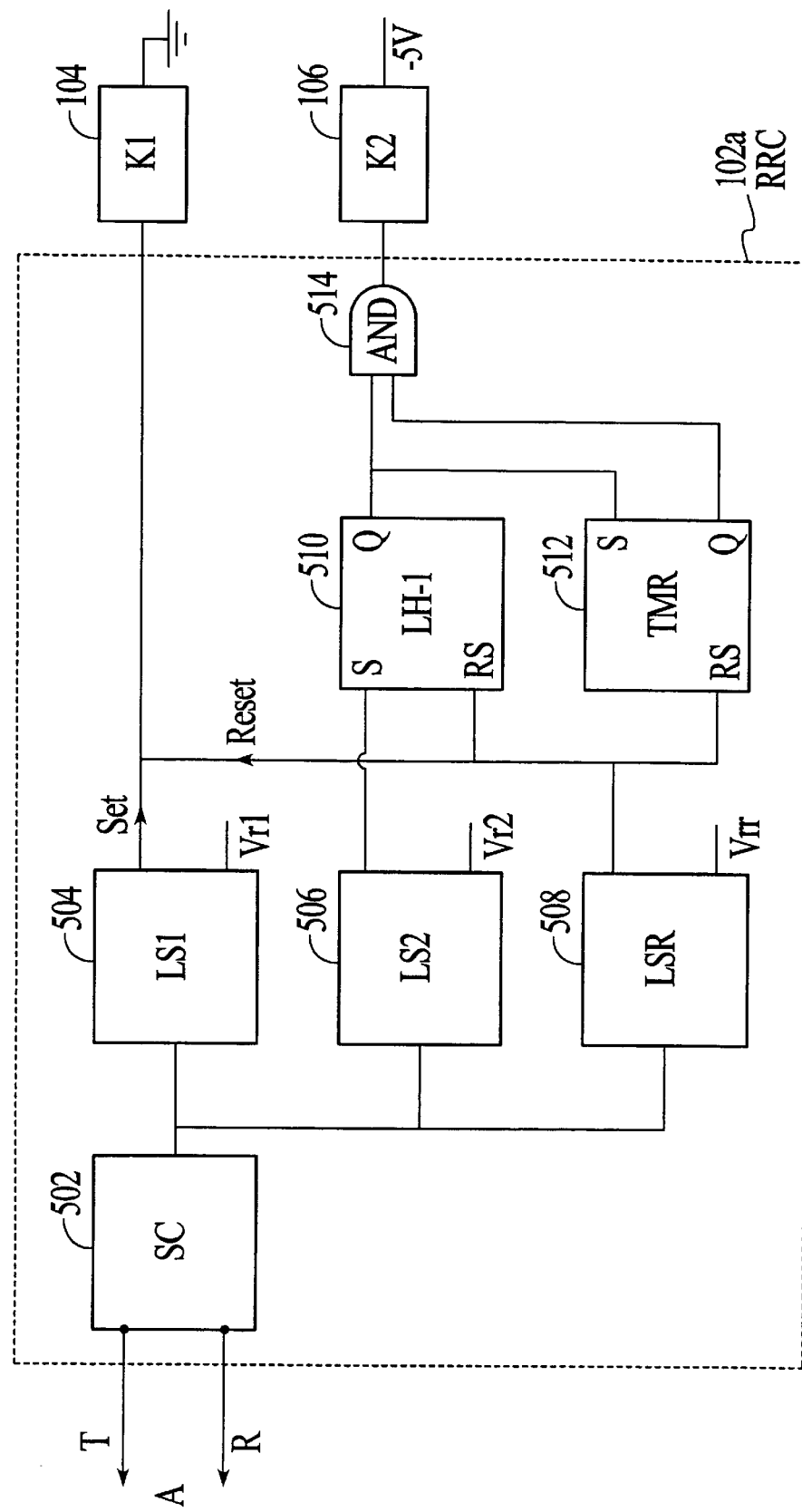
FIG. 5C illustrates a functional block diagram of the remote relay control in accordance with the first preferred embodiment of the present invention.

FIG. 5C illustrates a functional block diagram of the RRC in accordance with the first preferred embodiment of the present invention. The RRC 102a includes a Signal Conditioning block (SC) 502 connected to a first Level Sense (LS1) 504, second Level Sense (LS2) 506, reset Level Sense (LSR) 508, and tip and ring wires at point A. The LS1 504 detects the presence of the first voltage signal (e.g., +68V), the LS2 506 detects the presence of the second voltage signal (e.g., +78V), and the LSR 508 detects the presence of the third voltage signal (e.g., −88V). The LS1 504 is further connected to and controls the first latching relay K1 104. $V_{r1}$ is the reference voltage for LS1 504, $V_{r2}$ is the reference voltage for LS2 506, and $V_{rr}$ is the reference voltage for LSR 508. The reference voltages are pre-defined and can also be adjustable depending on the type and values of the hardware components used in a particular circuitry.

The relay K1 104 is preferably a latching-type relay (includes memory), which could be either electromechanical or semiconductor solid state. The latching-type feature is essential in that once the applied voltage exceeds a pre-defined reference voltage, a constant voltage is applied to actuate the relay K1. The latching-type feature is also essential because it can then allow application of a voltage across the T and R to perform other functions without affecting the first relay K1.

A latch (LH-1) 510 is connected to the LS2 506 and controls the second non-latching relay K2 106. A "watchdog" timer (TMR) 512 is used in case of a system malfunction. After a timeout period (i.e., 60 seconds), the TMR 512 automatically resets the relays K1 104, K2 106 back to the normal mode.

During operation, the test head sends a first voltage signal to the tip and ring wires. The SC 502 conditions the signal and inputs it to the LS1 504, LS2 506, and LSR 508. The first voltage signal is detected by LS1 504, which in turns sets the first relay K1 104. This indicates the monitor mode, and the test head monitors the copper loop.

If the copper loop is on-hook, the test head generates and sends a second voltage signal to the tip and ring wires. After signal conditioning by the SC 502, the second voltage signal is detected by the LS2 506. This signal is then outputted by the LS2 506 and sent to the input S of the flip flop LH-1 510. The LH-1 510 then outputs a logical 1 via output Q to the AND gate 514 and TMR 512, producing a second logical 1 at the TMR's output Q. The logical 1 outputs from both the LH-1 510 and TMR 512 are sent to the AND gate 514 to produce a logical 1 at the AND gate's output to set the second relay K2 106. The system is now in the bypass mode and loop testing can be performed.

When loop testing is completed, the test head sends a third voltage signal to the tip and ring wires. This signal is detected by the LSR 508 after signal conditioning via the SC 502. The LSR 508 in turn sends the third voltage signal to reset relay K1 104 and to the LH-1 510, which in turn resets relays K2 106, K1 104 in a sequential or simultaneous manner for this particular case. The system is now back in the normal mode.

In the event that the third reset voltage signal is not received by or sent to the LH-1 510 due to some malfunction, the relay K2 106 automatically resets itself back to the normal mode via the TMR 512, thereby providing a fail-safe bypass function and POTS service is connected back to the splitter in the normal mode.

Figure 5D:
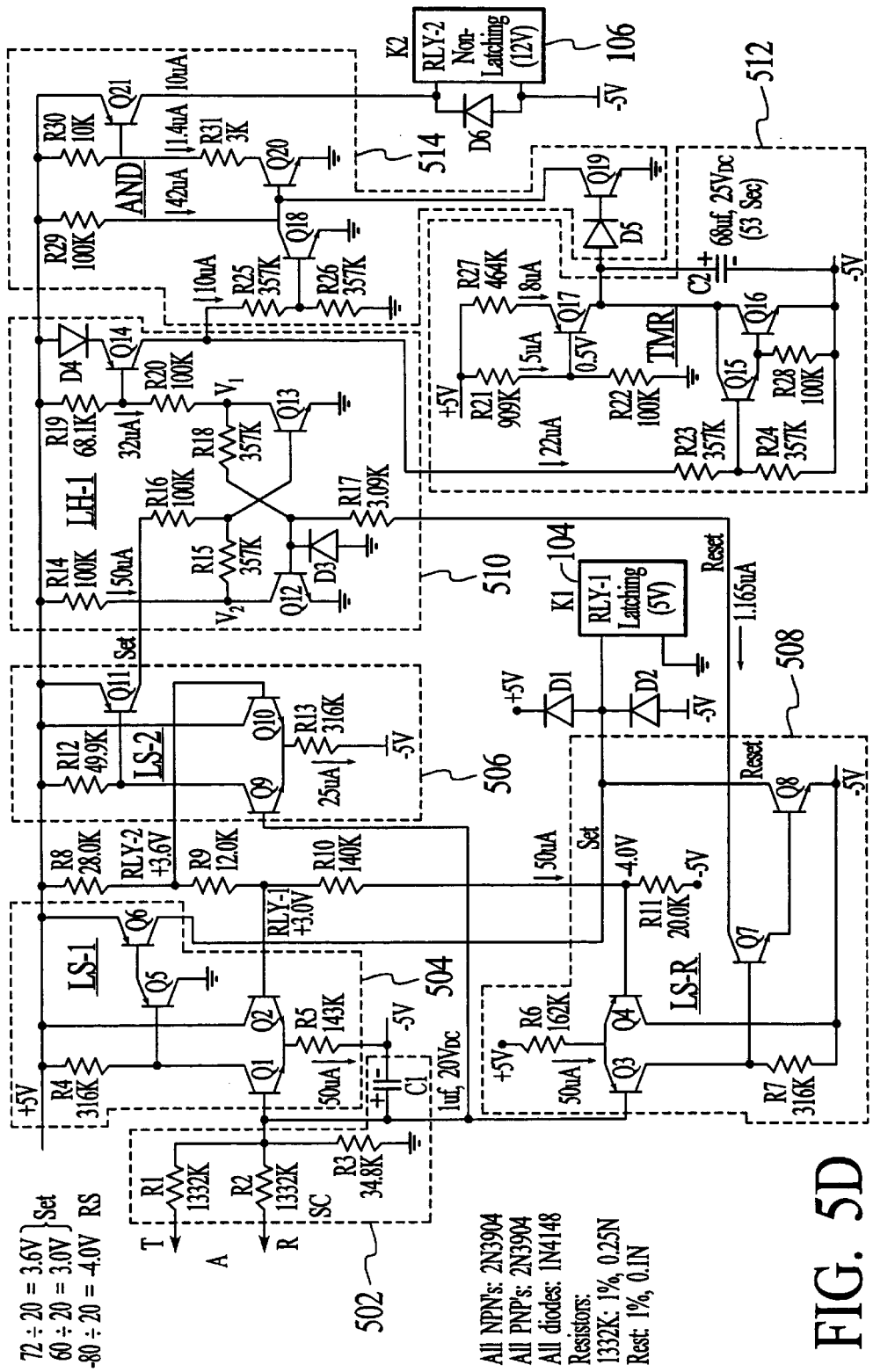
FIG. 5D illustrates an example of a detailed circuit diagram of the remote relay control in accordance with the first preferred embodiment of the present invention.

FIG. 5D illustrates an example of a detailed circuit diagram of the RRC 102a in accordance with the first preferred embodiment of the present invention. Reference will be made concurrently to FIGS. 5C and 5D for a more complete understanding of the detailed circuit diagram.

Functionally, the LS1 504 includes transistors Q1, Q2, Q5, Q6, and resistors R4, R5. The LS2 506 is represented by transistors Q9–Q11, and resistors R12, R13, and the LSR 508 is represented by transistors Q3, Q4, Q7, Q8, and resistors R6, R7, R11. Next, the LH-1 510 circuitry consists of transistors Q12–Q14, resistors R14–R20, and diodes D3, D4. The TMR 512 includes transistors Q15–Q17, resistors R21–R24, R27–R28, and capacitor C2 (used for switching as it is charged up). The AND gate 514 includes transistors Q18–Q21, resistors R25–R26, R29–R31, and diode D5. The SC 502 consists of resistors R1–R3 and capacitor C1.

Figure 6A:
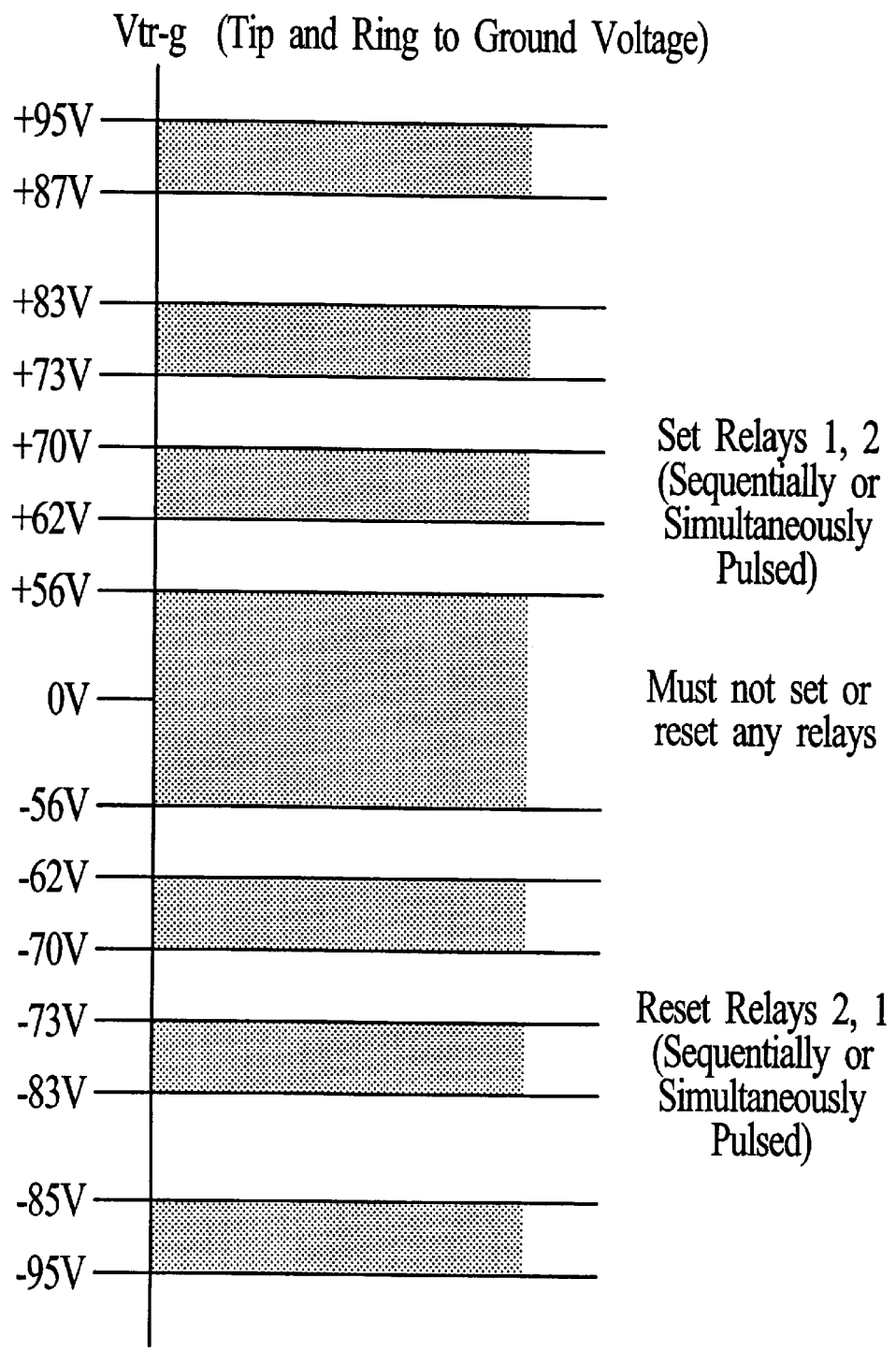
FIG. 6A illustrates a specific example of the remotely actuated splitter bypass signaling definition in accordance with the second preferred embodiment of the present invention.

FIG. 6A illustrates a specific example of the RASB signaling definition in accordance with the second preferred embodiment of the present invention. The second preferred embodiment is directed to the state machine control. Similar to the first preferred embodiment, voltages are applied to the tip and ring wires with respect to the ground wire.

The RASB signaling definition of the second preferred embodiment is similar to the first preferred embodiment in that the relays are "set" or actuated when an appropriate voltage magnitude and polarity is applied from tip and ring wires with respect to the ground wire, and relays are "reset" when an appropriate voltage magnitude and polarity is applied from tip and ring wires with respect to the ground wire. The polarity of the voltages for set and reset conditions can be interchangeable by a person skill in this art by appropriately designing the circuit (i.e., set having negative polarities and reset having positive polarities).

In greater detail, each relay can be set with a positive polarity, using some arbitrary voltage range, which range is pre-defined/pre-designed. Conversely, each relay can be reset with a negative polarity, using some arbitrary voltage range, which range again is pre-defined/pre-designed.

In the state machine approach, the first and second relays K1 and K2 can be set sequentially using the +62 to +70 voltage range. Likewise, these relays can be reset sequentially or simultaneously for this particular embodiment from the second relay K2 to the first relay K1 in the −73 to −83 voltage range. In this manner, multiple relays can be remotely actuated from the CO by providing different voltages and polarities. It is further noted that in FIG. 6A, the voltage ranges are for illustrative purposes only and other practical voltage ranges can be substituted for those illustrated.

The signaling definition allows the relays to be set sequentially such that relay K1 is set first and then relay K2, and so on. For example, it is important that the relay K1 is set first for monitor mode before setting relay K2 for bypass mode. This is accomplished by sequentially setting the relay K1 first and then the relay K2. Likewise, the relays are sequentially reset such that relay K2 is reset first and then relay K1, and so on. This assures that the signaling path is not cut off pre-maturely during the relays' setting and resetting processes. For this particular case, sequential reset is not necessary.

Figure 6B:
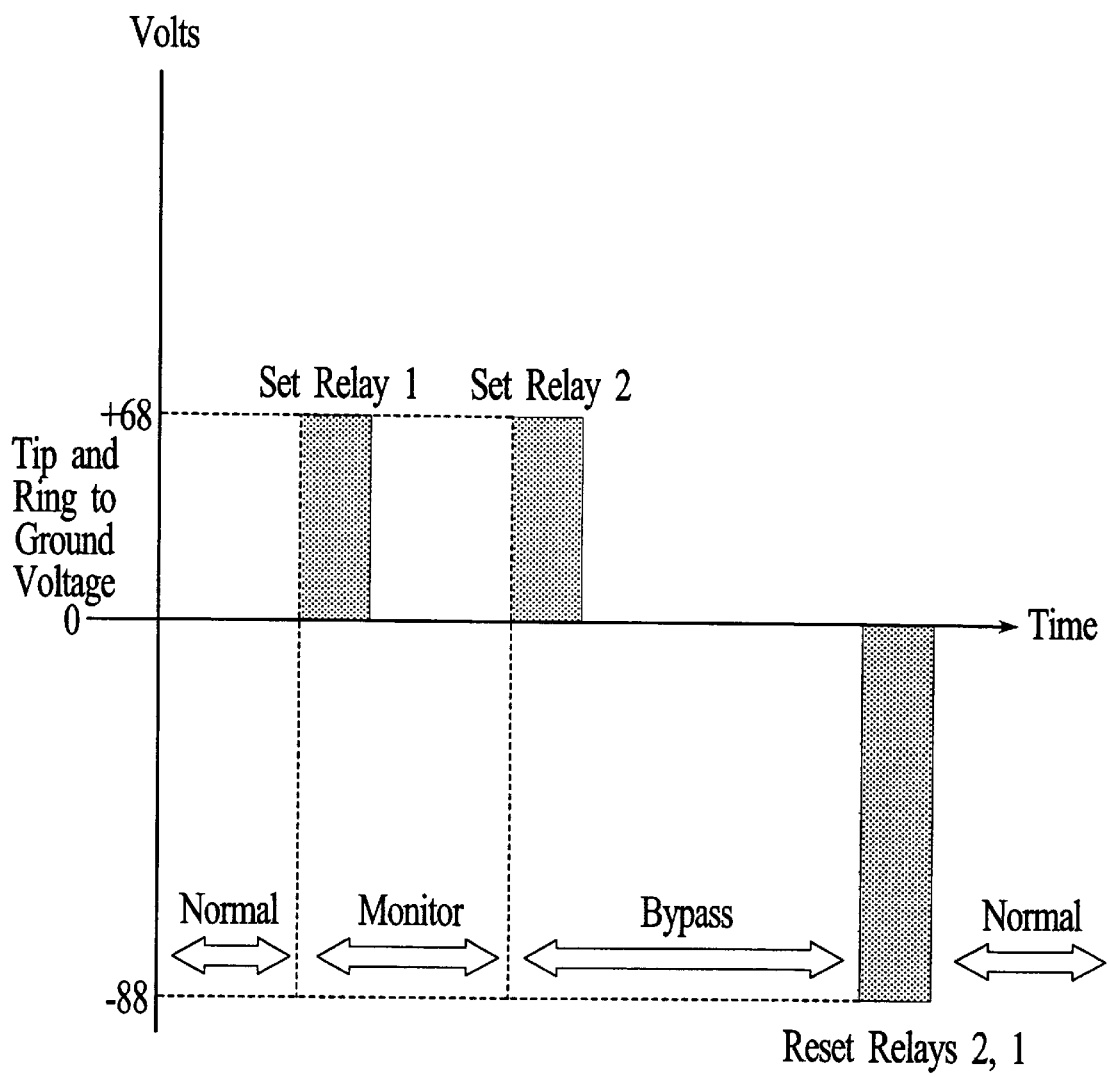
FIG. 6B illustrates a signaling sequence of FIG. 6A in accordance with the second preferred embodiment of the present invention.

FIG. 6B illustrates a signaling sequence of FIG. 6A in accordance with the second preferred embodiment of the present invention. As shown in FIG. 6B, the circuit is generally in normal mode, which mode refers to the traditional line sharing system.

When copper loop testing is initiated from the xDSL circuit, the selected copper loop pair is connected to the test head. A first signal (e.g., +68 volts) is generated to set relay K1, which indicates the monitor mode. The loop is then connected to the test head through resistor R. The test head checks for DC voltage and voice band signals for monitoring whether the copper loop is off-hook or on-hook. If off-hook, the system aborts accessing this copper loop for testing. If it is on-hook, a second voltage signal (e.g., +68 volts) is sent to set second relay K2, which provides the test head direct access to the copper loop while bypassing the CO splitter. Thus, two sequential voltage signals of equal value are used to set the relays K1, K2. This puts the system in the bypass mode, which enables loop testing by the test head. When loop testing is completed, a third voltage signal (e.g., −88V) is used to reset the relays back to normal mode.

Figure 6C:
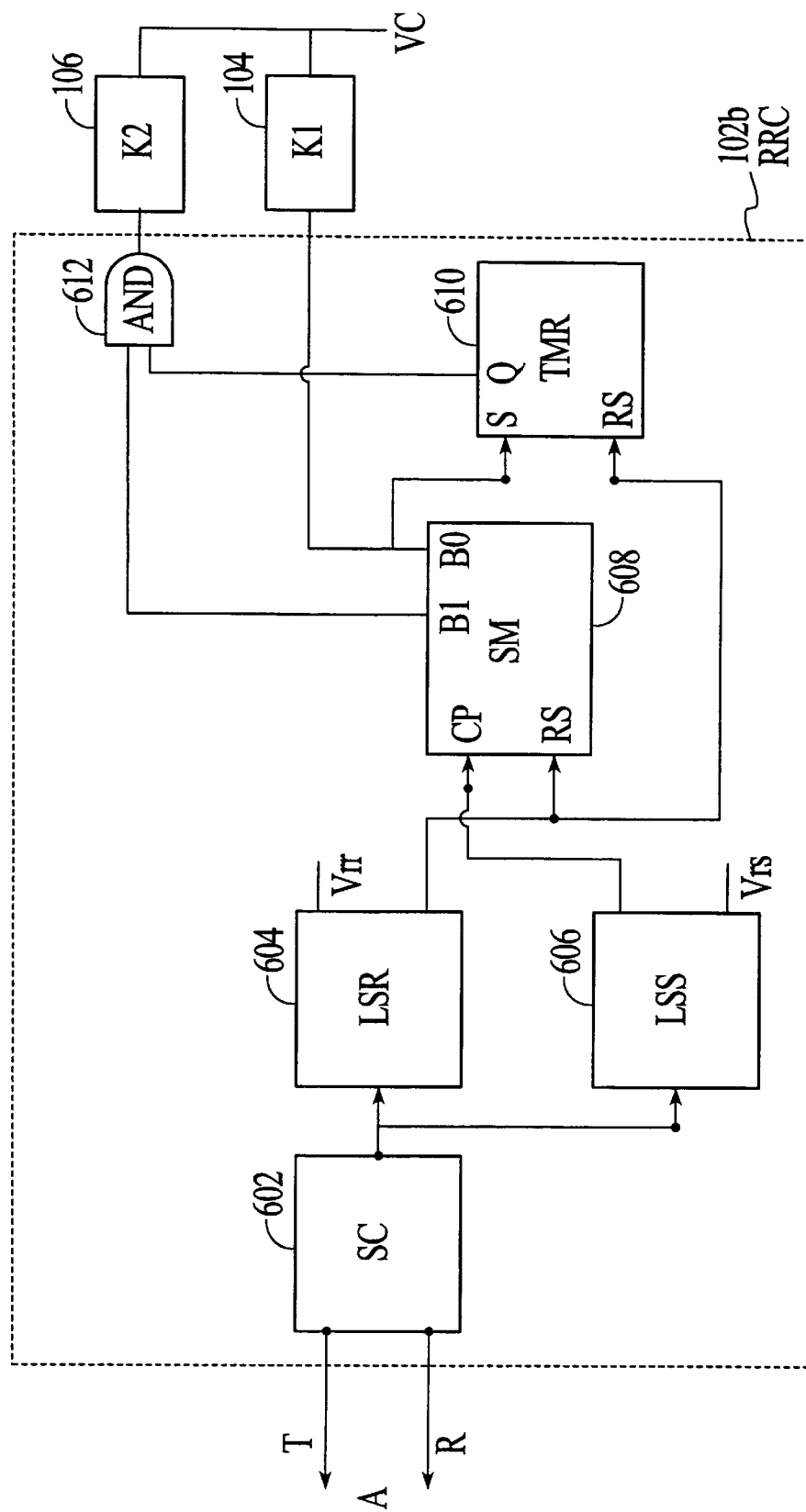
FIG. 6C illustrates a functional block diagram of the remote relay control in accordance with the second preferred embodiment of the present invention.

FIG. 6C illustrates a functional block diagram of the RRC in accordance with the second preferred embodiment of the present invention. The RRC 102b includes a Signal Conditioning block (SC) 602 connected to a reset Level Sense (LSR) 604, Level Sense Set (LSS) 606, and tip and ring wires at point A. The RRC 102b also includes a State Machine (SM) 608, timer (TMR) 610, and an AND gate 612. First and second relays K1 104, K2 106 are preferably non-latching (standard) type relays. The "watch-dog" timer (TMR) 610 is used in case of a system malfunction. After a timeout period (i.e., 60 seconds), the TMR 610 automatically resets the relays K1 104, K2 106 back to the normal mode. $V_{rr}$ is the reference voltage for LSR 604, and $V_{rs}$ is the reference voltage for LSS 606.

When the system is in the normal mode, the outputs B0 and B1 of the SM 608 are represented by logical 0s. During operation from normal mode to monitor mode, the test head sends a first voltage signal (e.g., +68V) to the tip and ring wires at point A. The SC 602 conditions the signal inputs it to the LSR 604 and LSS 606. The first voltage signal is detected by the LSS 606, which in turn sends the voltage signal to the SM 608 at input CP to increment the SM 608 from normal to monitor mode. The output B0 of the SM 608 is now represented by a logical 1 and is used to set the first relay K1 104, thereby actuating the monitor mode. Meanwhile, the output from B0 of SM 608 is sent to the input S of the TMR 610 to begin the timing signal.

During the monitor mode, if the copper loop is determined to be on-hook, the test head generates and sends a second voltage signal (e.g., +68) equal to the first voltage signal to the tip and ring wires. After signal conditioning by the SC 602, the second voltage signal is detected by the LSS 606 to increment the SM 608 from monitor to bypass mode by outputting a logical 1 at the B1 output.

The logical 1 outputs from both B0 of SM 608 and Q of TMR 610 are sent to the AND gate 612 to produce a logical 1 at the AND gate's output to set the second relay K2 106. The system is now in the bypass mode and loop testing can be performed.

When loop testing is completed, the test head sends a third voltage signal (e.g., −88V) to the tip and ring wires. The third voltage signal is detected by the LSR 604 after signal conditioning via the SC 602. The LSR 604 in turn sends the third voltage signal to the SM 608, which in turn resets first and second relays K2 106, K1 104 by generating logical 0s at B0 and B1. The system is now in the normal mode.

In the event that the third reset voltage signal is not received by or sent to the LSR 604 or SM 608 due to some malfunction, the relay K2 106 automatically resets itself back to the normal mode via the TMR 610.

Figure 6D:
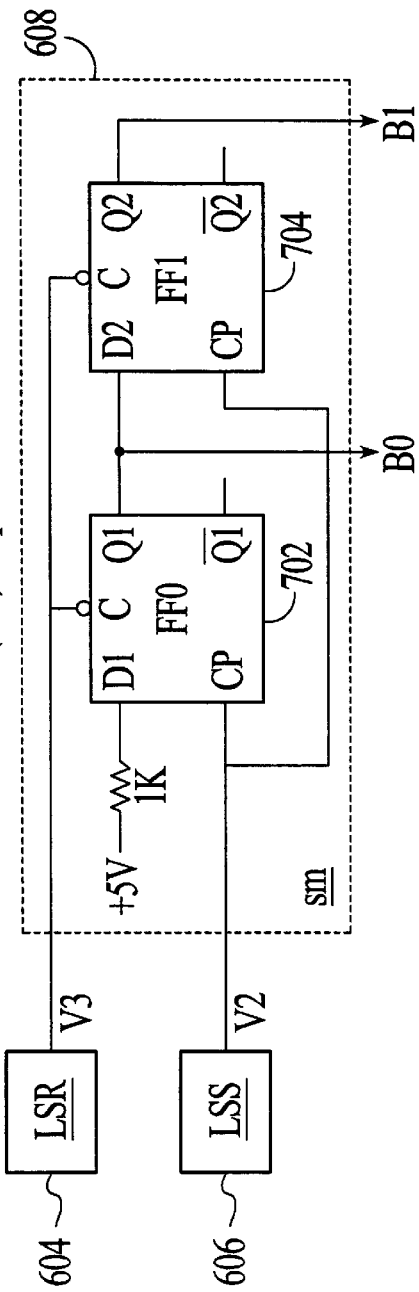
FIG. 6D illustrates a more detailed block diagram of the state machine in accordance with the second preferred embodiment of the present invention.

FIG. 6D illustrates a more detailed block diagram of the state machine in accordance with the second preferred embodiment of the present invention. The state machine is represented by FF0 (flip flop 0) 702 and FF1 (flip flop 1) 704. The voltage signals from LSR 604 and LSS 606 are sent to the FF0 702 and FF1 704 at inputs C (clear input) and CP (clock input), respectively. The output B0 is generated from outputs Q1 of FF0 702, and the output B1 is generated from output Q2 of FF1 704.

Figure 6E:
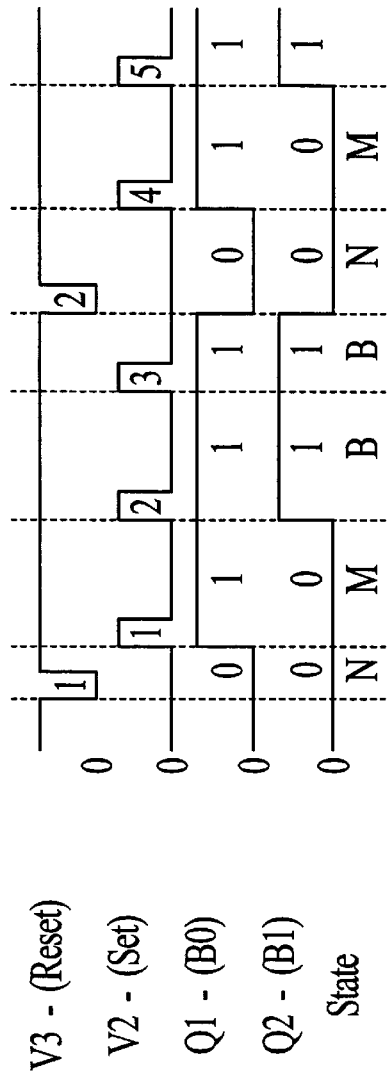
FIG. 6E illustrates a state table in accordance with the second preferred embodiment of the present invention.

FIG. 6E illustrates a state table in accordance with the second preferred embodiment of the present invention. As shown, the normal mode is active when the output B0 and B1 signals are logical 0, which represents that the first and second relays K1, K2, are not set. The monitor mode is active when the output B0 signal is a logical 1 and the output B1 signal is a logical 0, which represents that the first relay K1 is set and the second relay K2 is not set. The bypass mode is active when both the output B0 and B1 signals are logical 1, which represents that the first and second relays K1, K2 are set.

Figure 6F:
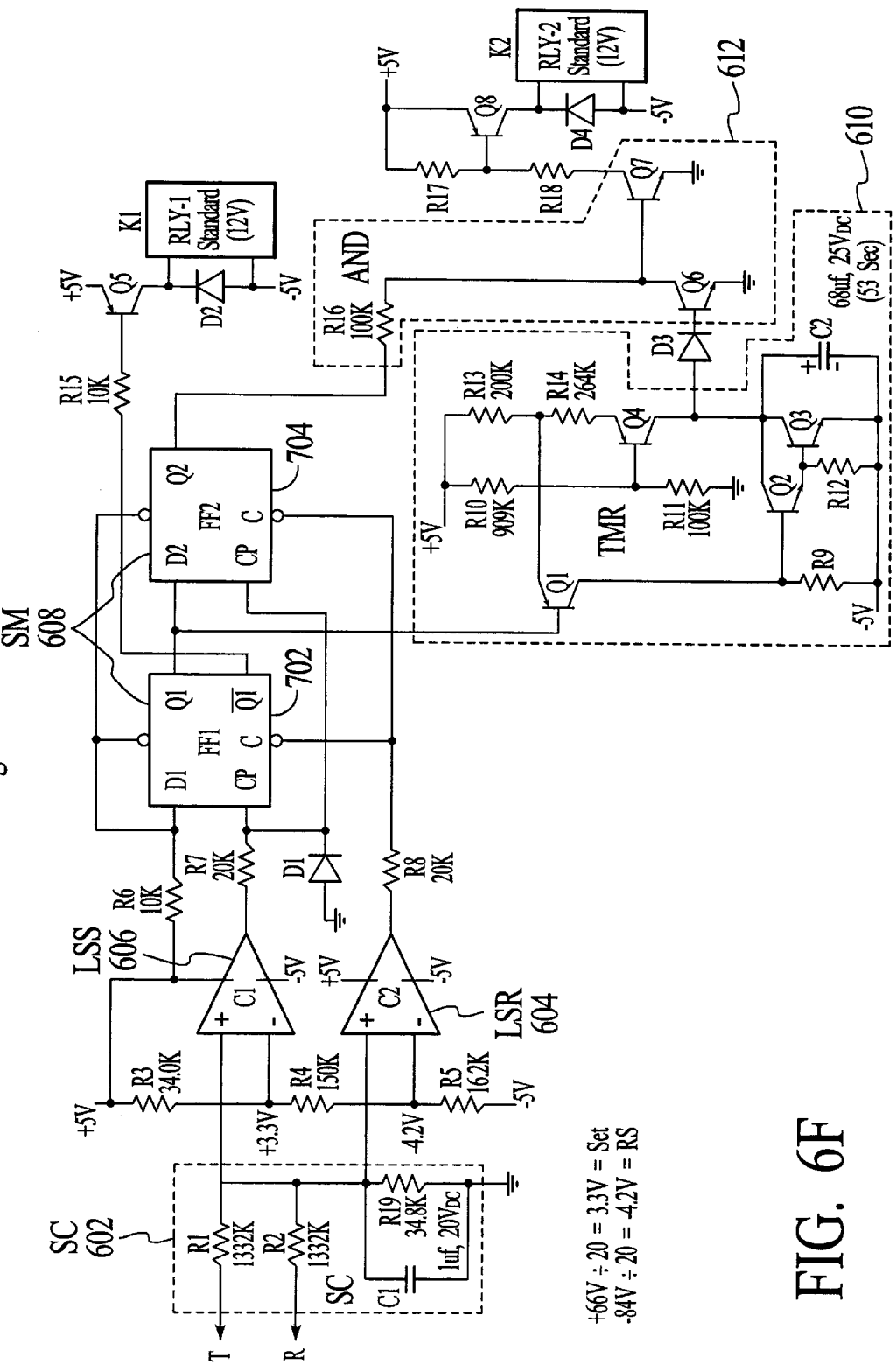
FIG. 6F illustrates an example of a detailed circuit diagram of the remote relay control in accordance with the second preferred embodiment of the present invention.

FIG. 6F illustrates an example of a detailed circuit diagram of the RRC 102b in accordance with the second preferred embodiment of the present invention. Reference will be made concurrently to FIGS. 6C and 6D for a more complete understanding of the detailed circuit diagram of FIG. 6F.

Functionally, the SM 608 includes FF1 and FF2. The LSR 604 is represented operational amplifier C2, and the LSS 606s is represented by operational amplifier C1. Next, the TMR 610 includes transistors Q1–Q4, resistors R9–R14, and capacitor C2 (used for switching as it is charged up). The AND gate 612 includes transistors Q6, Q7, and resistor R16. The SC 602 consists of resistors R1, R2, R19 and capacitor C1.

In other embodiments, other components can be substituted for the specific components described herein so long as these components perform essentially identical functions as described herein.

In the previous descriptions, numerous specific details are set forth, such as specific functions, components, etc., to provide a thorough understanding of the present invention. However, as one having ordinary skill in the art would recognize, the present invention can be practiced without resorting to the details specifically set forth.

Although only the above embodiments have been described in detail above, those skilled in the art will readily appreciate that many modifications of the exemplary embodiments are possible without materially departing from the novel teachings and advantages of this invention.

We claim:

1. A method of enabling a plurality of central office splitters coupled to a voice circuit and a xDSL circuit in a line sharing system, comprising:

(1) selecting a copper pair for carrying an enable signal;

(2) checking the presence of a signature for the selected copper pair to carry the enable signal;

(3) generating the enable signal from a cross connect; and (4) transmitting the enable signal from the cross connect to the plurality of splitters through the selected copper pair, thereby enabling the plurality of splitters.

2. A method according to claim 1, wherein after the transmitting step, the plurality of splitters reverts to a default mode when the enable signal is not present.

3. A method according to claim 2, wherein the plurality of splitters reverts to the default mode using non latching relays in the splitters.

4. A method according to claim 1, wherein the selected copper loop that carries the enable signal terminates with a DC/DC converter.

5. A method according to claim 1, wherein the enable signal is a DC voltage.

6. A method according to claim 5, wherein the DC voltage is generated from a central office battery.

7. A method according to claim 6, wherein the DC voltage is 50±6 volts.

* * * * *